April 24, 1962 S. T. WILLIAMS 3,031,354
SIDEWALL VALVE FOR TUBELESS TIRES
Filed Nov. 30, 1956

INVENTOR
SELDEN T. WILLIAMS
BY
Churchill, Weymouth & Engel
ATTORNEYS.

United States Patent Office 3,031,354
Patented Apr. 24, 1962

3,031,354
SIDEWALL VALVE FOR TUBELESS TIRES
Selden T. Williams, Bellerose, N.Y., assignor to Scovill Manufacturing Company, Waterbury, Conn., a corporation of Connecticut
Filed Nov. 30, 1956, Ser. No. 625,462
4 Claims. (Cl. 156—252)

The present invention relates to a method of mounting a valve stem in the side wall of a tire casing and to a tire having such valve stem incorporated therein.

Tire casings, and particularly tubeless tire casings, do not require the valve to be mounted through the rim. In fact, it has been proposed to provide a tubeless tire casing with a valve mounted in the side wall of the tire in proximity to the bead. To accommodate such valve it was found necessary to drill a hole in the side wall of the tire, which operation ruptured the reinforcing fabric and weakened the tire structure.

The present invention has among its objects to mount a valve in the side wall of a tire without recourse to drilling a hole therethrough or otherwise weakening the tire structure.

A further object is to provide a novel method of mounting a valve stem in a fabric reinforced side wall of a tire in a relatively simple manner without altering the tire casing mold.

A still further object is to provide and mount a metal valve stem or a rubber covered metal valve stem within the side wall of a tire in a manner such that the mouth of the valve stem will be protected against injury.

A still further object is to provide an improved tire construction of novel design.

The foregoing and other objects of the invention, not specifically enumerated, are accomplished by inserting a tire valve stem through the wall of a tire casing between adjacent strands of the plies of fabric reinforcements in said tire wall through the aid of a pointed cylindrical member which is pushed through the wall of the casing prior to its being vulcanized. Preferably, in inserting the valve stem, the cylindrical member is ejected by the valve stem, which latter is then bonded to the casing.

The invention, comprising the steps of the method involved in mounting the valve stem, and the tire resulting from the practice of said method, will be better understood from the detailed description which follows, when considered in connection with the accompanying drawing, wherein.

Figure 1:
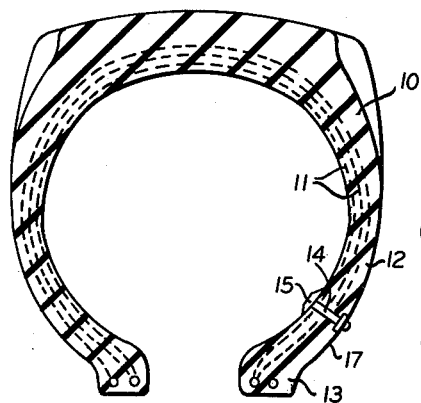
FIGURE 1 is a radial section through a tire casing embodying the present invention.
Figure 2:
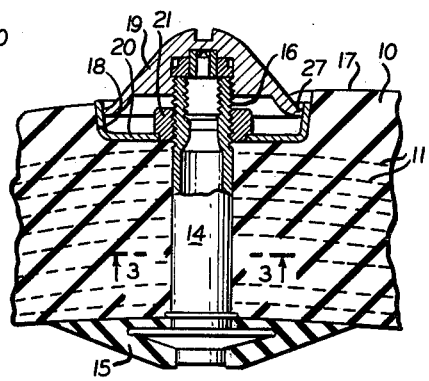
FIG. 2 is a greatly enlarged view of the portion of the section shown in FIG. 1, containing the valve stem.
Figure 3:
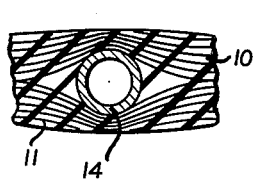
FIG. 3 is a section taken along the plane of the line 3—3 of FIG. 2 and showing the diversion of the strands of a ply of the reinforcement where the valve stem extends therethrough.

Referring first to FIGS. 1 to 3, there is shown sectional views of a tubeless tire embodying the invention consisting of a casing 10 formed of rubber stock reinforced with a plurality of plies 11 of rubberized cord or steel fabric, said casing having mounted and bonded in a side wall 12 of the casing, in proximity to a bead portion 13 thereof, between adjacent strands of the plies of the reinforcing fabric 11, a tire valve stem 14 having at its inner end an enlarged rubber covered base 15 and at its outer end a reduced screw-threaded nipple 16. The valve stem may be of conventional form. Preferably the outer face 17 of the side wall 12 is formed with a recess or socket 18 encompassing the nipple end of the valve stem so that a valve cap 19, when applied to the valve stem, will substantially seat within the recess 18 to protect the outer end of the valve stem from injury. As shown in FIG. 2, the socket is reinforced by a cup washer 20 which is retained in place by a nut 21 engaging the screw-threaded nipple and seating against the base of the washer.

Figure 4:
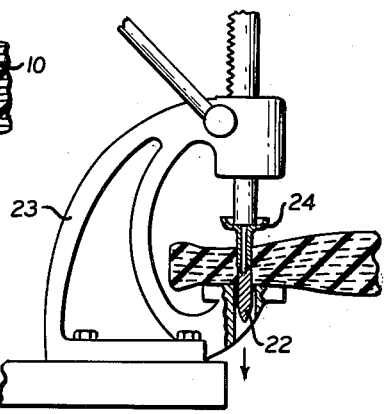
FIG. 4 is a side elevation showing the manner in which one step of the method is carried out.
Figure 5:
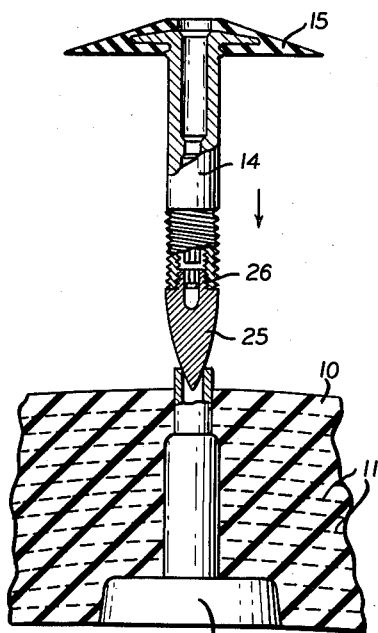
FIG. 5 is a view, on an enlarged scale, showing another step of carrying out the method of the invention.

In mounting the valve stem within the casing, the following procedure is substantially followed: A hole is formed in the side wall of the casing by pressing through adjacent strands of the respective plies of the uncured tire wall just before vulcanization, a needle or pointed cylindrical member 22 which is preferably heated. This may be done in an arbor press 23 (FIG. 4) or other suitable power operated means. The piercing needle thrusts aside and diverts adjacent strands of the plies of the reinforcing fabric, as best shown in FIG. 3. When the pointed cylindrical member has been inserted in the wall, a mushroom-like member 24, preferably made of stainless steel, is then partially telescoped into the cylindrical member to force the latter member out of the tire wall to assume a position, as shown in inverted relation in FIG. 5. A second stroke of the arbor press or other power operated means may be employed to accomplish the second step. The uncured tire casing is then placed in a vulcanizer mould and cured in the usual manner, the mould sidewall serving to hold the mushroom head within the rubber. Preferably the length of the mushroom member 24 should be slightly greater than the thickness of the tire sidewall and, although this will temporarily indent the curing bag, it will not injure said bag. On removal of the cured tire casing from the vulcanizer mould, the mushroom member is pressed out of the casing in a manner shown in FIG. 5, preferably by the insertion of the valve stem 14 which is to be permanently bonded to the casing. The insertion of the valve stem may be simplified by the use of a mounting tip 25 having a screw-threaded nipple 26 engageable with the internal threads at the nipple end of the valve stem.

Prior to inserting the valve stem, the area at the inner face of the tire wall around the stem of the mushroom member is buffed, cleaned and coated with bonding cement. The inner face of the rubber base 15 is likewise buffed and coated with bonding cement, so that when the valve stem is finally positioned, the rubber base 15 is stitched into place and then vulcanized to the tire wall in any well known manner.

The mounting of the valve stem is completed by applying the cup washer 20 and retaining nut 21, inserting a valve core (not shown) and then applying the valve cap 19.

The cup washer 20 and the retaining nut 21 enable the stem to be quite firmly secured in the tire sidewall, thereby supplementing the seal provided by the base 15. The cup washer imbeds the valve mouth into the side wall without weakening it and takes advantage of sidewall support and protection. The dome cap 19 protects the stem from injury and, by virtue of the edge flange 27 which abuts against the lateral wall of the cup washer 20, still further supports the valve stem.

Figure 6:
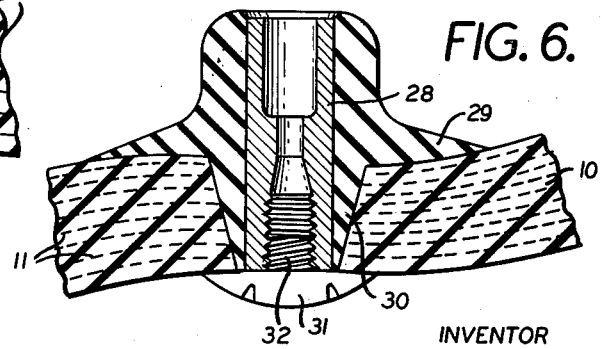
FIG. 6 is a view similar to FIG. 2 showing a modified form of valve stem mounted in a tire casing wall.

In FIG. 6 there is shown the manner in which a rubber covered valve stem 28 having an enlarged base 29 and tapered rubber housing 30 may be mounted in a tire side wall. Of course, in mounting such valve stem the mushroom member would have a tapered shank to provide a tapered hole in the tire wall. Such rubber covered valve, it will be appreciated, could be vulcanized in the wall of the tire and could accommodate a closure cap 31 provided with a screw-threaded shank 32 engageable with the internal threads at the mouth of the valve stem.

Although there has been shown and described a preferred method of mounting a valve stem in a fabric reinforced tire casing wall, it is within the purview of the invention to directly mount the valve stem into an uncured tire casing and then vulcanize the casing with the valve stem in situ. It will also be understood that changes in the method, steps and procedures hereinbefore described may be varied within the range of engineering skill without departing from the spirit of the invention as hereinafter claimed.

What I claim is:

1. The method of mounting a tire valve stem in a side wall of a multiply fabric-reinforced tire casing each ply of which has reinforcing strands disposed in side-by-side relation, comprising, prior to vulcanizing the casing, pushing a removable pointed cylindrical member through the wall of the casing, in the course of which action the pointed member will divert adjacent strands of each of the overlying plies of reinforcement, using said cylindrical member as an ejectable guide for inserting a tire valve stem through the wall of the casing, ejecting said cylindrical member by inserting a tire valve stem which is left in the casing to replace the cylindrical member and bonding the valve stem in situ to the casing.

2. The method of mounting a tire valve stem in a side wall of a multiply fabric-reinforced tire casing each ply of which has reinforcing strands disposed in side-by-side relation, comprising, prior to vulcanizing the casing, pushing a removable pointed cylindrical member, which will not bond to the casing during vulcanization, through the wall of a tire casing between adjacent strands of each of the overlying plies of reinforcement to divert said adjacent strands, vulcanizing the casing with the cylindrical member in situ, ejecting said cylindrical member by inserting a tire valve stem which is left in the casing to replace the cylindrical member and bonding said valve stem in situ.

3. The method according to claim 2 wherein an annular socket is formed in the outer face of the casing wall contiguously around the cylindrical member.

4. The method according to claim 3 wherein the socket in the outer face of the wall is provided by a mushroom shaped head on the cylindrical member and the cylindrical member is ejected by inserting the valve stem from the inner face of the casing.

References Cited in the file of this patent

UNITED STATES PATENTS

| Re. 17,057 | Voit | July 31, 1928 |
| 864,226 | Blodgett | Aug. 27, 1907 |
| 1,245,838 | Wallace | Nov. 6, 1917 |
| 1,876,367 | Wakefield | Sept. 6, 1932 |
| 2,052,130 | Cassady | Aug. 25, 1936 |
| 2,065,033 | Stevens | Dec. 22, 1936 |
| 2,161,775 | Miller et al. | June 6, 1939 |
| 2,194,635 | Bronson | Mar. 26, 1940 |
| 2,512,774 | Musselman | June 27, 1950 |
| 2,634,785 | Tubbs | Apr. 14, 1953 |
| 2,690,001 | Cowles | Sept. 28, 1954 |
| 2,746,812 | Eger | May 22, 1956 |
| 2,828,657 | Fromberg | Apr. 1, 1958 |